(12) United States Patent
Borremans et al.

(10) Patent No.: US 10,742,916 B2
(45) Date of Patent: Aug. 11, 2020

(54) IMAGING SENSOR AND METHOD FOR READING OUT IMAGE INFORMATION

(71) Applicant: IMEC VZW, Leuven (BE)

(72) Inventors: Jonathan Borremans, Leuven (BE); Nicolaas Tack, Leuven (BE); Maarten Rosmeulen, Leuven (BE); Paul Goetschalckx, Leuven (BE); Piet De Moor, Leuven (BE)

(73) Assignee: IMEC VZW, Leuven (BE)

( * ) Notice: Subject to any disclaimer, the term of this patent is extended or adjusted under 35 U.S.C. 154(b) by 34 days.

(21) Appl. No.: 16/094,165

(22) PCT Filed: Apr. 6, 2017

(86) PCT No.: PCT/EP2017/058265
§ 371 (c)(1),
(2) Date: Oct. 16, 2018

(87) PCT Pub. No.: WO2017/182287
PCT Pub. Date: Oct. 26, 2017

(65) Prior Publication Data
US 2019/0132541 A1 May 2, 2019

(30) Foreign Application Priority Data

Apr. 19, 2016 (EP) .................................... 16165970

(51) Int. Cl.
*H04N 5/372* (2011.01)
*H04N 5/347* (2011.01)
*H04N 5/378* (2011.01)

(52) U.S. Cl.
CPC .......... *H04N 5/37206* (2013.01); *H04N 5/347* (2013.01); *H04N 5/378* (2013.01)

(58) Field of Classification Search
CPC ..... H04N 5/37206; H04N 5/347; H04N 5/378
See application file for complete search history.

(56) References Cited

U.S. PATENT DOCUMENTS 4,242,700 A 12/1980 Weimer
4,280,141 A 7/1981 McCann et al.
(Continued)

FOREIGN PATENT DOCUMENTS

EP 2088763 A2 8/2009
WO WO-2003106917 A2 12/2003

OTHER PUBLICATIONS

Moor et al. "Enhanced time delay integration imaging using embedded CCD in CMOS Technology" 2014 IEEE Electron Devices Meeting, Dec. 15-17, 2014, pp. 4.6.1-4.6.4, San Francisco, CA.
(Continued)

*Primary Examiner* — Shahbaz Nazrul
(74) *Attorney, Agent, or Firm* — Moser Taboada

(57) ABSTRACT

An imaging sensor is disclosed, comprising: a set of at least two charge-coupled device, CCD, sub-arrays, wherein each sub-array comprises pixels arranged in columns and rows, and each pixel being arranged to accumulate an electric charge proportional to an intensity of light incident on the pixel; a time delay and integration, TDI, clocking circuitry for controlling and timing transfer of accumulated electric charges between rows of pixels in a column direction in order to integrate the accumulated electric charges in each column of pixels; wherein each CCD sub-array further comprises a readout row for converting the integrated electric charge of each column of pixels into voltage or current, wherein the readout row comprises transistors enabling readout of the signal by the readout block; and a readout block which is arranged to receive input from selected readout rows and convert the input into digital domain or convert the input to a combined representation of pixel values based on the set of CCD sub-arrays.

9 Claims, 4 Drawing Sheets

(56) References Cited

U.S. PATENT DOCUMENTS

| | | | |
|---|---|---|---|
| 5,379,065 | A | 1/1995 | Cutts |
| 5,760,899 | A | 6/1998 | Eismann |
| 5,926,215 | A | 7/1999 | Gregory et al. |
| 6,678,048 | B1 | 1/2004 | Jeffrey et al. |
| 7,235,773 | B1* | 6/2007 | Newman ................ H04N 5/361 250/214 C |
| 2003/0193589 | A1* | 10/2003 | Lareau ................ H04N 3/1525 348/294 |
| 2006/0197949 | A1 | 9/2006 | Ahmed et al. |
| 2010/0007778 | A1 | 1/2010 | Yong |
| 2010/0177224 | A1* | 7/2010 | Vampola .............. H04N 3/1525 348/295 |
| 2014/0061434 | A1 | 3/2014 | Masao |
| 2015/0136954 | A1* | 5/2015 | Wein .................... G01J 3/2823 250/208.1 |
| 2015/0136955 | A1 | 5/2015 | Wein |
| 2017/0150029 | A1* | 5/2017 | Robertson .......... H04N 5/35554 |
| 2017/0257605 | A1* | 9/2017 | Iwakura ............ H01L 27/14607 |
| 2018/0098014 | A1* | 4/2018 | Zuleta ................ H01L 27/14621 |

OTHER PUBLICATIONS

Lambrechts et al: "A CMOS-compatible, integrated approach to hyper- and multispectral imaging", 2014 IEEE Electron Devices Meeting, Dec. 15-17, 2014, pp. 10.5.1-10.5.4, San Francisco, CA.
International Search Report dated Jun. 27, 2017 for PCT Application No. PCT/EP2017/058265.

* cited by examiner

IMAGING SENSOR AND METHOD FOR READING OUT IMAGE INFORMATION

TECHNICAL FIELD

The present invention relates to an imaging sensor and, in particular, an imaging sensor to be used for time delay integration.

BACKGROUND

The combination of Time Delay Integration (TDI) and spectral filtering is useful when the features of TDI are needed (linear movement of a scene, relative to the sensor, and a desire to improve SNR by multiple integration) in combination with an interest in a part of the spectrum by means of filtering. However, traditional CCD TDI image sensors only integrate one CCD TDI array. Hence, a multispectral of color filter combination requires multiple CCD TDI sensors (large, expensive, cumbersome and doesn't scale well), or a filter wheel (cumbersome and filters cannot be used simultaneously). Embedded CCD (eCCD), as shown in 2014 IEEE International Electron Devices Meeting, 15-17 Dec. 2014, pages: 4.6.1-4.6.4, combines CMOS with CCD process technology and allows to process CCD gates with CMOS readout and control.

SUMMARY OF THE INVENTION

It is an object of the invention to provide an image sensor enabling an improved TDI detection. It is a particular object of the invention to provide an imaging sensor enabling dynamic control of the TDI detection.

According to a first aspect of the invention, there is provided an imaging sensor, comprising: a set of at least two charge-coupled device, CCD, sub-arrays, wherein each sub-array comprises pixels arranged in columns and rows, and each pixel being arranged to accumulate an electric charge proportional to an intensity of light incident on the pixel; a time delay and integration, TDI, clocking circuitry for controlling and timing transfer of accumulated electric charges between rows of pixels in a column direction in order to integrate the accumulated electric charges in each column of pixels; wherein each CCD sub-array further comprises a readout row for converting the integrated electric charge of each column of pixels into voltage or current, wherein the readout row comprises transistors enabling readout of the signal by the readout block; and a readout block which is arranged to receive input from selected readout rows and convert the input into digital domain, or convert to a combined representation of pixel values based on the set of CCD sub-arrays.

Using a large number of rows included for integration of charges, an obtained signal-to-noise ratio is high. However, there is a risk that the CCD sub-array saturates, i.e. reaches its full well capacity (FWC). Thus, for low intensity of light, it may be desired to use a large number of rows for integration. On the other hand, for high intensity of light, it may be desired to use a small number of rows for integration.

eCCD together with imec's monolithically integrated filter technology (as e.g. outlined in Lambrechts et al, A CMOS-compatible, integrated approach to hyper- and multispectral imaging, 2014 IEEE International Electron Devices Meeting, 15-17 Dec. 2014, pages 10.5.1-10.5.4) allows elegantly to combine and readout TDI with many filters on the same die. Thanks to the structure according to the invention, it is possible to provide a dynamic selection of the image capturing properties in TDI. The number of rows may be different in different CCD sub-arrays, which may be used, for example, when the light conditions may be different for different wavelength bands. For each wavelength band, the imaging sensor may use CCD sub-arrays that are not saturated. Also, input from a plurality of CCD sub-arrays for the same wavelength band may be combined to further increase the signal-to-noise ratio for the wavelength band. Thus, a good signal-to-noise ratio may be obtained for each wavelength band.

The readout block being arranged to receive input from selected readout rows and convert the input into the digital domain (e.g. by using an analog-to-digital (ADC) converter per column) or convert the input to a combined representation of pixel values based on the set of CCD sub-arrays could thus be that the readout block adds the input from a plurality of CCD sub-arrays for the same wavelength band, or that the readout block selects a single input from a plurality of CCD sub-arrays, wherein the selected single input may correspond to a good signal-to-noise ratio (whereas non-selected input may for instance be saturated). Thus, the readout block may be arranged to provide a dynamic range of intensities of light. Alternatively, the data from different sub-arrays may be sent off-chip as such and combined in an off-chip readout system.

Also, the readout block or the readout system may take input from CCD sub-arrays associated with different wavelength bands such that a plurality of combined pixel values may be provided, wherein each pixel value may correspond to a single wavelength band.

A multiple of CCD sub-arrays may be used for the same wavelength band and multiple of sub-arrays may thus be selected for the same wavelength band. The signals from the multiple of CCD sub-arrays may thus be combined in the readout block or the readout system resulting in a multiple of full well capacity (of the combined CCD sub-arrays) and therefore a dynamic range of the imaging sensor increases.

Each CCD sub-array may be associated with a specific filter such that the CCD sub-array captures light in a wavelength-band defined by the specific filter.

The filter may be a narrow passband filter and a large number of CCD sub-arrays with different filters may be provided in order to allow for hyperspectral imaging.

Alternatively, each row in a CCD sub-array may be associated with a specific filter, such that different filters are provided for different rows in the CCD sub-array. Thus, the CCD sub-array may integrate charges for a combination of wavelengths defined by the filters associated with the CCD sub-array.

It should be realized that a set of CCD sub-arrays may comprise a large number of CCD sub-arrays. The CCD sub-arrays in the set may provide a plurality of CCD sub-arrays associated with different wavelength bands, and a plurality of CCD sub-arrays for each wavelength band, in order to provide a possibility to optimize the signal-to-noise ratio for each wavelength band. The readout block or the readout system may combine input from the selected (for instance, non-saturated) CCD sub-arrays for each wavelength band to provide a representation of light intensity for each wavelength band.

It should also be realized that a plurality of readout blocks may be provided. The imaging sensor may thus comprise a plurality of sets of CCD sub-arrays, wherein each set may be connected to a respective readout block. Thus, for instance, each readout block may handle CCD sub-arrays for a specific wavelength band.

According to an embodiment, each CCD sub-array is covered by an integrated filter, such as a color filter, a multi- or hyperspectral filter, for selecting a predetermined part of the wavelengths irradiated to the pixels in the CCD sub-array. The filters may be different for each CCD sub-array and can be even different within a sub-array (in order to create specific wavelength combinations). As realized by a person skilled in the art, a filter may be provided using many different types of filtering technologies for preventing light with undesired characteristics to reach the pixels. For instance, the filters may utilize absorption, diffuse or specular reflection of light, interference in multiple layers of the filter, such as in dichroic filters or Fabry-Perot filters, or different transmittance properties based on polarization of incoming light.

According to an embodiment, at least two of the CCD sub-arrays in the set have different number of rows. TDI rows/stages can be different and can be optimized to match the number of created photo-electrons in the pixels as a result of incoming light, quantum efficiency and spectral filter transmission. This prevents going into saturation, and hence allows to maximize the signal to noise ratio.

According to an embodiment, the CCD sub-arrays in the set have equal number of rows. The number of CCD sub-arrays can be optimized to increase the dynamic range, by selecting in some cases multiple sub-arrays for the same spectral band. The output signal is added in the readout stages resulting in a multiple of effective full well capacity (and therefore dynamic range increase).

Varying the number of CCD sub-arrays and therefore changing the effective FWC can be used to optimize the pixel size, i.e. towards smaller pitch and hence resolution, without the penalty of smaller FWC and dynamic range.

According to an embodiment, a plurality of CCD sub-arrays in the set are associated with identical filters, and the number of rows of the plurality of CCD sub-arrays is logarithmically increasing. By combining CCD sub-arrays eventually/optionally with the same spectral filter applied with a logarithmical increasing number of rows (e.g. 1, 3, 10, 30), a maximal signal to noise ratio is obtained over a wide incoming signal.

According to an embodiment, the readout rows are connected to the same readout block and wherein input from the readout rows to the readout block is time-interleaved. The readout of the sub-arrays may be time-interleaved to share the same readout for all the sub-arrays. A spacing between sub-arrays can be adjusted to match the time-delay of the readout to the effective spatial movement of the scene. All CCD sub-arrays may be clocked at an individual phase delay of an optimized value.

According to an embodiment, the readout rows may be arranged to adjust parameters, such as gain, resolution, input range, least significant bit, depending on a selected CCD sub-array. Adjustment of the readout parameters may be used to optimize performance.

According to an embodiment, at least two of the CCD sub-arrays in the set have different pixel pitches. CCD sub-arrays can consist of pixels with exactly the same pitch or a fraction of the pitch of the largest pixel used. For instance, a 20 µm pitch pixel can be used for pixels with a spectral filter on top, while two 10 µm pixels may be used for a panchromatic pixel.

According to an embodiment, at least two of the CCD sub-arrays in the set have different pixel pitches, covering the same wavelength, for simultaneously achieving high resolution and high full well capacitance.

According to an embodiment, at least two of the CCD sub-arrays in the set have different pixel types with different full well, to achieve increased dynamic range.

According to an embodiment, the imaging sensor may comprise readout rows on each side of the sub-arrays. This can be used for bi-directional readout of the CCD sub-blocks, i.e. accumulated charges may be moved in both directions along a column of pixels, depending on how the scene moves in relation to the imaging sensor.

According to an embodiment, the imaging sensor may comprise one or more sub-arrays with a dynamically selectable number of rows. This allows an optimization of the number of active rows. During the combination of the data from the different sub-arrays, the selection of the number of rows must be taken into account in order to get a correct result. The number of active rows can be set to maximize signal-to-noise ratio for an expected scene, or to compensate for imager quantum efficiency and/or filter transmission.

According to a second aspect of the invention, there is provided a camera comprising the imaging sensor according to the first aspect. The imaging sensor may thus be integrated into a camera for allowing capturing of TDI images of a scene by means of the camera.

According to a third aspect of the invention, there is provided a method for reading out image information, said method comprising: detecting an intensity of light incident on respective pixels of an imaging sensor, wherein the pixels are arranged in columns and rows in at least two sub-arrays; binning information of detected light intensities from a plurality of pixels in the sub-array to a common light intensity for the plurality of pixels; selecting at least one sub-array for readout of an image; reading out binned information from pixels in the at least one sub-array as input to a shared readout block; and converting the input into digital domain or to a combined representation of pixel values for a set of more than one sub-array.

Effects and features of this third aspect are largely analogous to those described above in connection with the first and second aspects. Embodiments mentioned in relation to the first and second aspects are largely compatible with the third aspect.

The method allows at least two sub-arrays to share a common readout block and the method allows selection of which sub-array(s) that are to provide detected light intensity information to the read-out block.

Thanks to the method, detected light in different set-ups of pixels may be passed to the shared readout block for converting the detected light to an image. Thus, the image to be formed may be controlled by which pixel information is passed to the shared readout block.

It is realized that the method of using a shared readout block of the imaging sensor could be used with different types of pixels, such that the imaging sensor does not necessarily comprise CCD sub-arrays, but may also or alternatively comprise active pixel sensors based on CMOS technology. By means of the method, digital TDI may be supported (wherein a voltage induced in several pixels rather than an accumulated charge may be binned).

The detected light intensities need not necessarily be binned (or accumulated) column-wise. Rather, the detected light intensities may be binned in any other configuration set by the imaging sensor. For instance, a set-up of 2×2 pixels may be used for binning detected light intensities. The binning of information from a plurality of pixels in a row of an array may thus be used instead of using different pixel pitches in different sub-arrays, as discussed above.

BRIEF DESCRIPTION OF DRAWINGS

The above, as well as additional objects, features and advantages of the present inventive concept, will be better understood through the following illustrative and non-limiting detailed description of preferred embodiments of the present invention, with reference to the appended drawings. In the drawings like reference numerals will be used for like elements unless stated otherwise.

DETAILED DESCRIPTION

Figure 1:
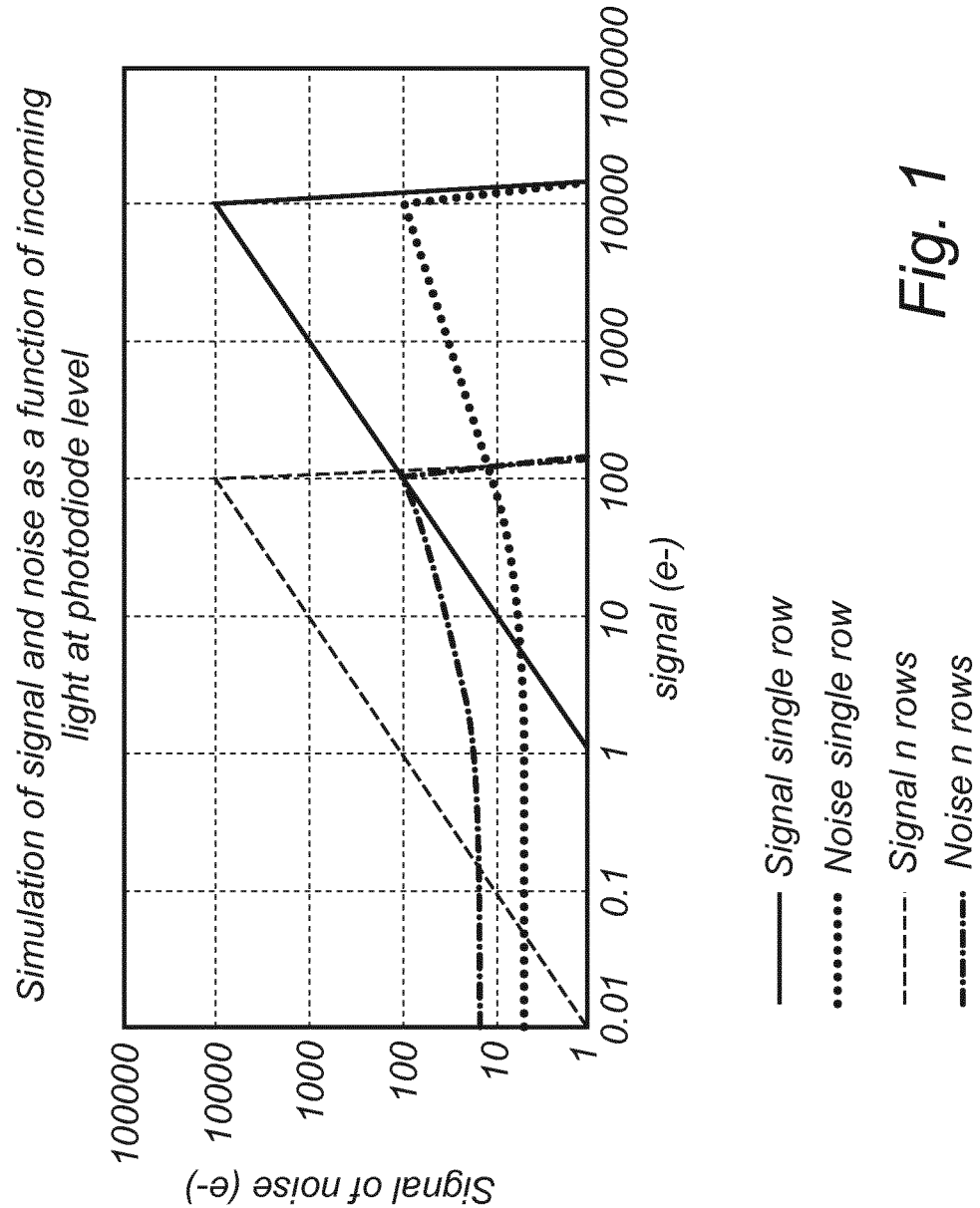
FIGS. 1 and 2 are graphs illustrating simulation of signal and noise (FIG. 1) and signal to noise ratio (FIG. 2) for a sub-array with a single row and multiple rows. On the bottom axis the number of photo-electrons generated in the photodiode is used.

Detailed embodiments of the present invention will now be descried with reference to the drawings.

It is proposed to use multiple CCD TDI arrays on the same chip, which (may or may not) share a single readout. Each CCD sub-array is processed with a dedicated integrated filter (or a combination thereof), which may be a color filter or spectral filter.

The CCD sub-arrays may be arranged in an embedded CCD (eCCD), as shown in 2014 IEEE International Electron Devices Meeting, 15-17 Dec. 2014, pages: 4.6.1-4.6.4, which combines CMOS with CCD process technology and allows to process CCD gates with CMOS readout and control. The disclosure of how CMOS process technology may be combined with CCD process technology in 2014 IEEE International Electron Devices Meeting, 15-17 Dec. 2014, pages: 4.6.1-4.6.4 is incorporated herein by reference.

The availability of charge-to-voltage or charge-to-current stages at the output of each CCD sub-array allows to select the wanted CCD sub-array and connect it to the shared readout block. The pixel size, array spacing, number of pixels and number of banks can be optimized to optimize SNR and dynamic range.

It can be seen in the following examples that the above parameters can be optimized to match the specific light conditions:

Assume the expected number of photo-electrons caused by incoming light in the pixels in a first spectral band is half of that in a second spectral band (e.g. because of the imager quantum efficiency (QE), the fill factor, the filter transmission, . . . ). Then, since the speed of both TDI arrays is the same by construction (as the same scene is moving at the same speed), spectral band is going to fill up faster, hence will saturate (reach its full well capacity) faster. To avoid this one may increase the speed, but effectively this will result in pixels in first band with less signal (and therefore less signal to noise ratio). Hence, it makes sense to make the number of TDI rows/stages of second band twice that of first band, to ensure the same use of the full well capacity. This is relevant using also the same readout with the same input range. Alternatively, the readout parameters may be adjusted depending on which band is selected. For example, when targeting first band, the LSB size may be reduced by 50% to achieve similar gain or resolution, or a gain amplifier with different gain for each sub-array may be implemented.

Assume the expected incoming light in the photodiodes in first band is half of that in second band, but that the maximum number of stages for second band is reached based on application or technology limitations. For example, the full well capacity is limited by the area of the pixel. Then, the second band CCD sub-array may be split in two CCD sub-arrays to achieve the same equivalent full well capacity. The signals can be added in the readout stage. This splitting of one sub-array with many rows into multiple sub-arrays with less rows allows to increase the maximum detectable signal and therefore the dynamic range. This is of particular interest when using the same pixels (at the same pitch) for both multi (MS)/hyperspectral (HSI) filters as for panchromatic (PAN) detection (involving much higher intensity to be detected). Splitting one sub-array in a few sub-arrays allows also to increase the number of effective bits obtained, without increasing the resolution of the ADC used in the readout (which is relevant at high speed). It also helps to maximize the maximum attainable signal to noise ratio (SNRmax). This is because the maximum SNR is obtained at full well (because the noise at that point is shot noise limited, i.e. sqrt(FWC)). Hence the larger the FWC, the larger SNRmax.

Figure 2:
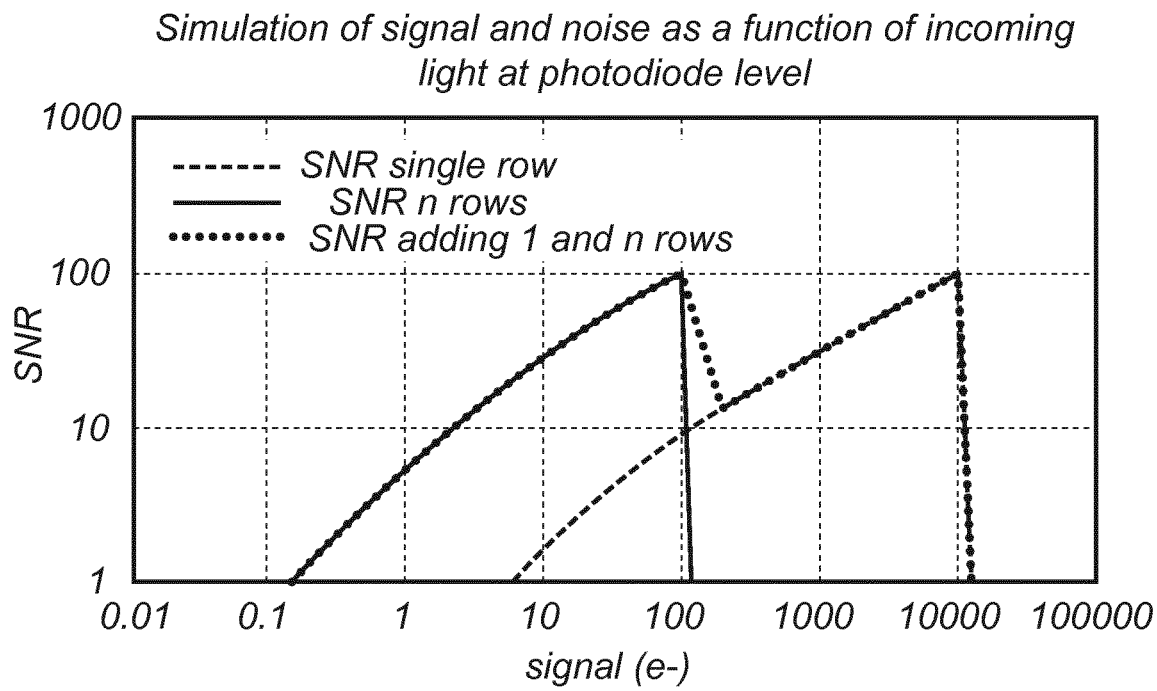

The signal to noise at low light level (SNRlow) is governed by readout noise, hence (charge/CCD-type) TDI helps in increasing the SNRlow by accumulating signal in different rows in a noiseless way and doing the conversion to voltage domain (and adding noise) only once at the end of the sub-array. This is the classical TDI operation: the more TDI rows, the better SNRlow becomes. However, multiple rows limit the effective FWC one can obtain (before going into saturation). Hence the SNRmax is limited when the SNRlow is maximized. One option is a selectable number of rows. The better solution is to have multiple sub-arrays with a different (ideally logarithmical) number of rows (e.g. 1 and 16). The SNRmax is covered by the single row sub-array, and the SNRlow by the other. In practice the SNR is maximized over a larger range of input light (which may be indeed the case in a multi/hyperspectral imager eventually in combination with panchromatic rows). The graphs in FIGS. 1 and 2 show a typical example.

A different light intensity is to be expected at different wavelengths (due to QE*filter transmission at a given wavelength), and this can be compensated by a different number of rows for a given wavelength. An optimal solution assuming 100 hyperspectral filters could be a large number (e.g. 200) of sub-arrays with a logarithmic increasing number of rows (and a few of each), e.g. 100×1 row (also for PAN detection a few of these can be used), 40×8 rows, 20×16 rows, 10×32 rows, 5×64 rows, 2×128 rows, 1×256 rows. On this type of eCCD TDI, one can map PAN/MS/HSI filters according to expected signal and wavelength performance (QE*Transmission efficiency).

Another possibility is to use the TDI action to construct different effective spectral responses per sub-array by applying different HSI filters in one sub-array. This allows (with one filter technology) to have e.g. broader (MS) type of filters, or custom combinations of filters (for a given application where the combination of signal at different wavelengths is a clear discriminator). Playing with the number of rows per sub-block, it also allows to mix different wavelength response with a different weighting factor (i.e. the number of rows per sub-block).

In all of the above examples the optimal solution will likely result in a lot of sub-arrays to be read-out. This is not practical using a classical CCD technology, as it necessitates an analog output (and amplification/buffer) per sub-array. In the embedded CCD in CMOS technology one benefits from the noiseless TDI operation in the TDI rows, in combination of the CMOS readout electronics which can readout many sub-blocks at high speed.

Figure 3:
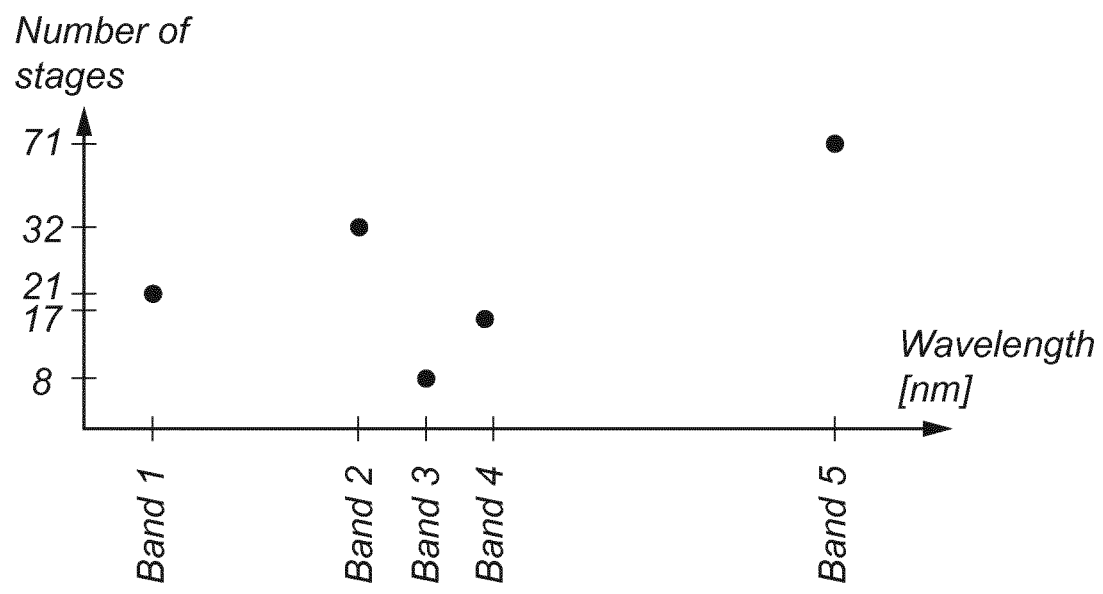
FIG. 3 is a graph illustrating how number of rows of CCD sub-arrays may differ for different spectral bands.

Referring now to FIG. 3, it illustrates how the number of rows of CCD sub-arrays may differ for different spectral bands in order for the imaging sensor to be adapted to capture images with good SNR for multiple wavelength bands.

Figure 4:
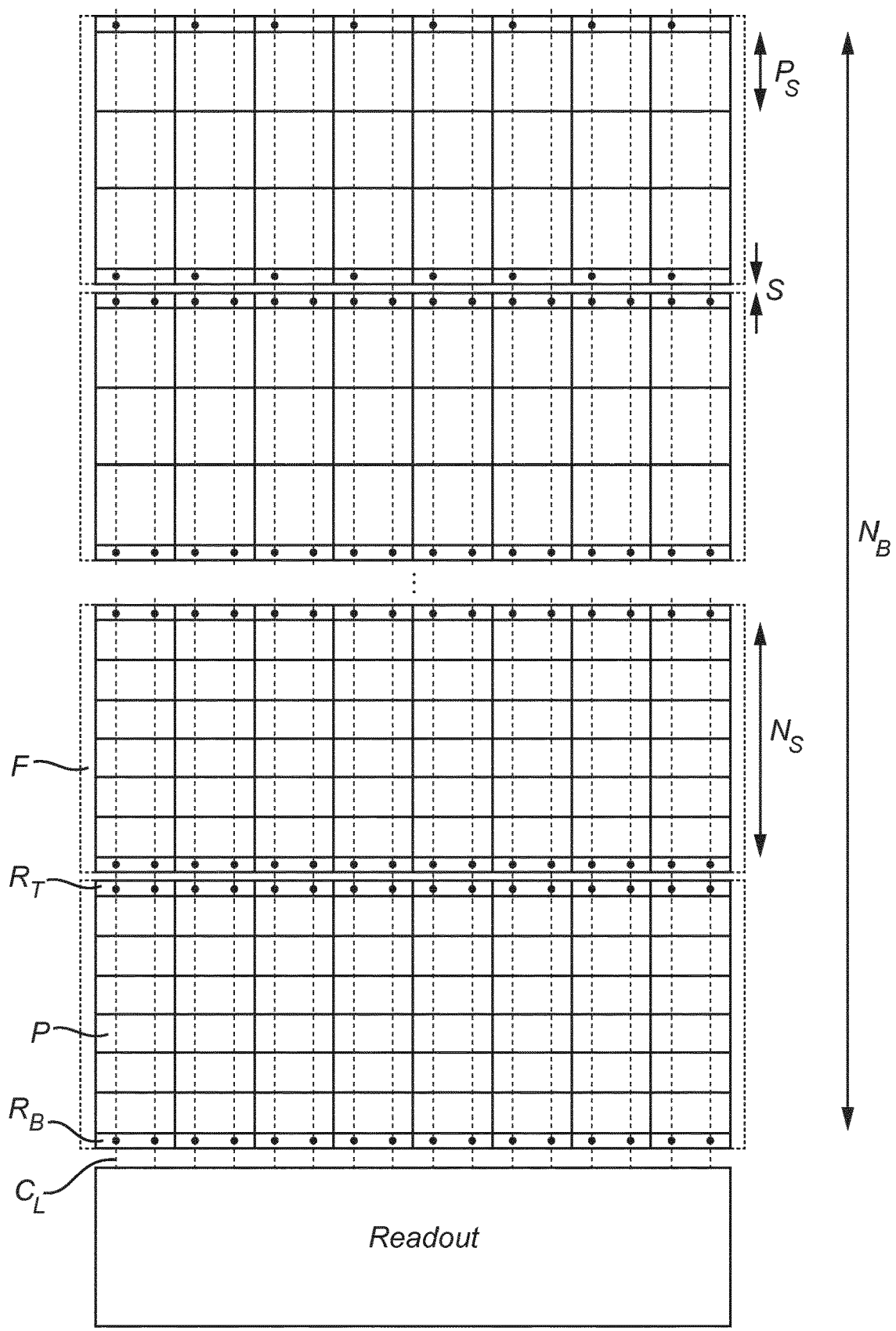
FIG. 4 is a schematic view of an imaging sensor according to an embodiment of the invention.

Referring now to FIG. 4, an imaging sensor is discussed in more detail. The imaging sensor comprises a plurality of pixels P, which are arranged to receive incoming light and convert the incoming light to an electric charge proportional to an intensity of incoming light on the pixel P.

The imaging sensor comprises a plurality of CCD sub-arrays. Each sub-array comprises a number of rows, as illustrated by $N_S$, and in total the imaging sensor comprises NB rows. The number of rows may differ between different sub-arrays.

The pixels P have a pixel size $P_S$, which may also differ between different sub-arrays in the imaging sensor.

Each sub-array is associated with a readout row on respective sides of the sub-array, $R_T$ and $R_B$, respectively. This implies that the imaging sensor may work for bi-directional readout, i.e. readout may occur at each side of the sub-array.

Charges accumulated in the pixels may be transferred to adjacent rows in the sub-array such that an integration of electric charges accumulated in each of the rows may occur. The transfer of charges may be synchronized with movement of a scene in relation to the imaging sensor for allowing TDI to be performed.

Each sub-array may be associated with a respective filter F. The filter may be monolithically integrated with the imaging sensor. However, it should also be realized that a separate filter may be used or that an optical component may be used for diverting light of a specific wavelength to the sub-array.

The readout rows may comprise transistors enabling readout of the signal by a readout block. The signal from the readout rows may be transferred on column lines $C_L$ to the readout block.

The sub-arrays may be arranged with a spacing S between adjacent readout rows. The spacing S may be arranged to match a time delay of the readout to the effective spatial movement of the scene, e.g. by $1/N_S$ or another optimized value. All CCD sub-arrays are clocked at an individual phase delay of $1/N_S$ or another optimized value.

The function of the readout block or readout system would be adding the signals of the different sub-arrays, but only if the signal is not reaching saturation (full well capacity). If one or more of the sub-arrays is reaching full well, this signal should not be added, and a digital bit/flag should be sent together with the output data that a certain block (or blocks) has not been contributing to the total signal. This digital bit/flag can also be used to identify the number of selected rows in a selectable number of row scheme.

Figure 5:
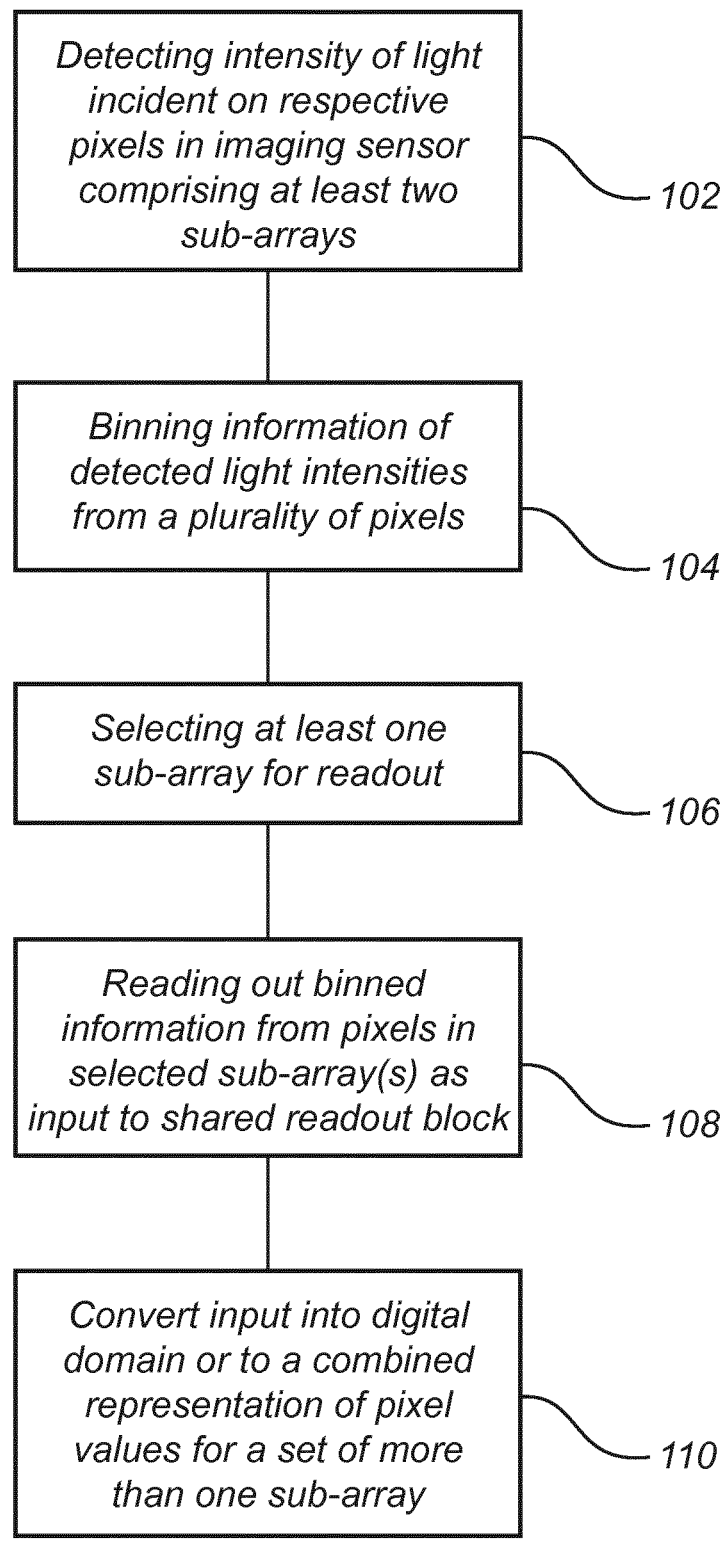
FIG. 5 is a flowchart of a method according to an embodiment of the invention.

Referring now to FIG. 5, a method for reading out image information will be described. The method makes use of a shared readout block, which is used by a plurality of sub-arrays of an imaging sensor for reading out the image information. The method may be used in reading out image information for an imaging sensor according to the embodiments as described above. The use of a shared readout block may also be used for reading out image information from imaging sensors having a plurality of sub-arrays, which are not necessarily arranged as described above with relation to the imaging sensor in FIG. 3.

The method may thus comprise detecting, step 102, an intensity of light incident on respective pixels of an imaging sensor, wherein the imaging sensor comprises at least two sub-arrays and the pixels are arranged in columns and rows in each of the at least two sub-arrays.

The method further comprises binning, step 104, information of detected light intensities from a plurality of pixels in the sub-array to a common light intensity for the plurality of pixels. The information may be binned according to any configuration of pixels. Thus, the light intensities in a column of pixels in the sub-array may be accumulated and, hence, the binning of information of detected light intensities may be performed column-wise. However, especially if the pixels are formed as active pixel sensors based on CMOS technology, a plurality of pixels in a desired configuration may share a floating diffusion node so that the light intensities detected in the pixels may be binned in the floating diffusion node. The binning of information may thus easily be made e.g. for a 2×2 pixel configuration and the sub-array may comprise a plurality of such 2×2 pixel configurations, in which information of detected light intensities is binned. The sub-arrays may be individually configured in the number of columns and how the information is binned among the pixels in the sub-array. Thus, two sub-arrays may have the same configuration, but may also have different configurations.

The method further comprises selecting, step 106, at least one of the sub-arrays for readout of an image. When a sub-array is selected, the binned information from pixels in the selected sub-array is read out, step 108, as input to the shared readout block. Thus, the readout block may selectively receive information from one or more sub-arrays in the imaging sensor.

The sub-arrays may be selected e.g. based on whether the signal of the sub-arrays have not reached saturation (full well capacity) as described above. However, sub-arrays may also be selected on other criteria, e.g. the wavelength being detected in the sub-array.

The method further comprises converting, step 110, the input into digital domain or to a combined representation of pixel values for a set of more than one sub-array. The readout block may thus perform analog-to-digital conversion of the input such that the image information from the at least one selected sub-arrays is converted to a digital image. However, the readout block may also or alternatively combine the pixel values from a plurality of sub-arrays (e.g. when a plurality of sub-arrays are detecting a common wavelength of light) in order to first combine the detected light intensities to a combined representation, before performing analog-to-digital conversion.

In the above the invention has mainly been described with reference to a limited number of embodiments. However, as is readily appreciated by a person skilled in the art, other embodiments than the ones disclosed above are equally possible within the scope of the invention, as defined by the appended claims.

The invention claimed is:

1. An imaging sensor, comprising:
a set of at least two charge-coupled device (CCD) sub-arrays, wherein each sub-array comprises pixels arranged in columns and rows, and each pixel being arranged to accumulate an electric charge proportional to an intensity of light incident on the pixel, wherein the at least two CCD sub-arrays are configured to detect a same wavelength band, and wherein the at least two CCD sub-arrays are configured to have at least one of a different number of rows, a different pixel pitch, or different pixel types with different full well capacitance;
a time delay and integration (TDI) clocking circuitry for controlling and timing transfer of accumulated electric charges between rows of pixels in a column direction in order to integrate the accumulated electric charges in each column of pixels;
wherein each CCD sub-array further comprises a readout row for converting the integrated electric charge of each column of pixels into voltage or current, wherein the readout row comprises transistors enabling readout of the signal by the readout block; and
a readout block which is arranged to receive input from selected readout rows and convert the input into digital domain or convert the input to a combined representation of pixel values based on the set of the at least two CCD sub-arrays.

2. The imaging sensor according to claim 1, wherein each CCD sub-array is covered by an integrated filter (F) for selecting a predetermined part of the wavelengths irradiated to the pixels in the CCD sub-array.

3. The imaging sensor according to claim 1, wherein the CCD sub-arrays in the set have equal number of rows.

4. The imaging sensor according to claim 1, wherein a plurality of CCD sub-arrays in the set of the at least two CCD sub-arrays are associated with identical filters.

5. The imaging sensor according to claim 1, wherein the readout rows are connected to the same readout block and wherein input from the readout rows to the readout block is time-interleaved.

6. The imaging sensor according to claim 1, wherein the readout rows may be arranged to adjust parameters depending on a selected CCD sub-array.

7. The imaging sensor according to claim 1, wherein the at least two CCD sub-arrays are configured for bidirectional readout.

8. A camera comprising the imaging sensor according to claim 1.

9. A method for reading out image information, said method comprising:
detecting an intensity of light incident on respective pixels of an imaging sensor, wherein the pixels are arranged in columns and rows in at least two sub-arrays and wherein at least two sub-arrays are configured to detect the same wavelength band and wherein the at least two sub-arrays are configured to have at least one of a different number of rows, a different pixel pitch, or different pixel types with different full well capacitance;
binning information of detected light intensities from a plurality of pixels in the sub-array to a common light intensity for the plurality of pixels;
selecting at least one sub-array for readout of an image;
reading out binned information from pixels in the at least one sub-array as input to a shared readout block; and
converting the input into digital domain or to a combined representation of pixel values for a set of more than one sub-array.

* * * * *